Sept. 28, 1954  V. H. MEYER  2,689,974
MOLD FILLING DEVICE FOR MAKING SHEET MATERIALS
Filed April 2, 1952  7 Sheets-Sheet 1
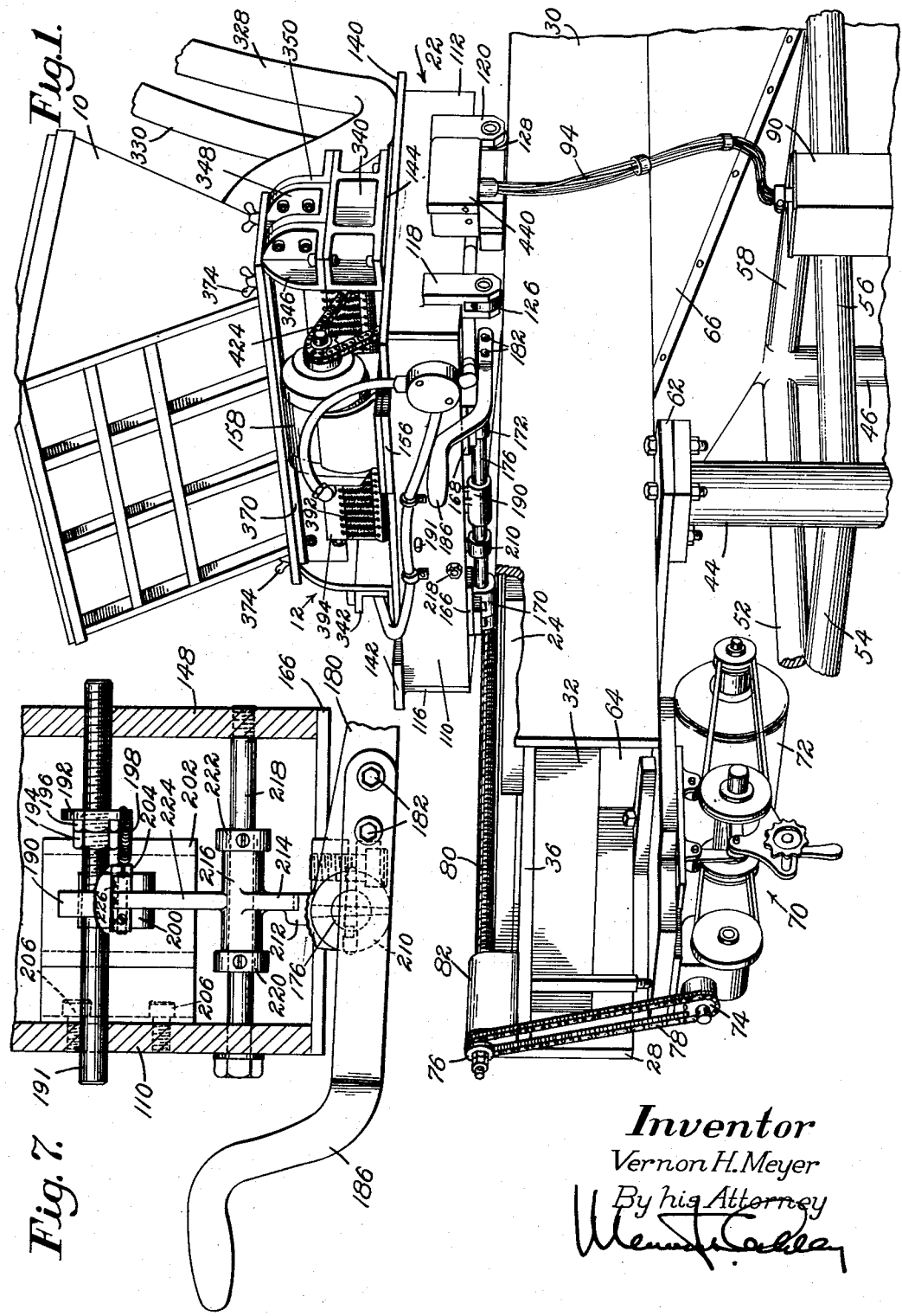
*Inventor*
Vernon H. Meyer
By his Attorney

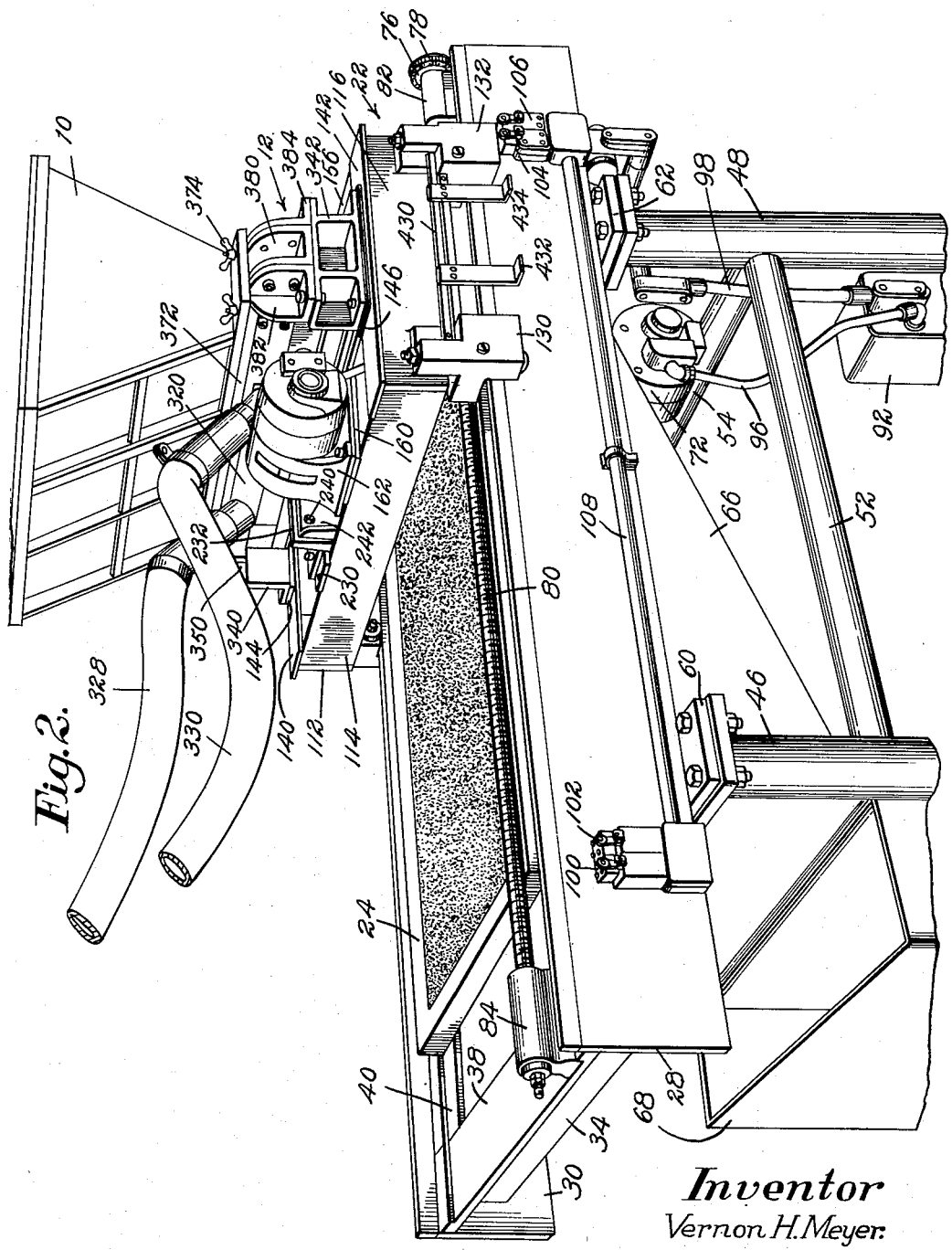

Sept. 28, 1954  V. H. MEYER  2,689,974
MOLD FILLING DEVICE FOR MAKING SHEET MATERIALS
Filed April 2, 1952  7 Sheets-Sheet 3
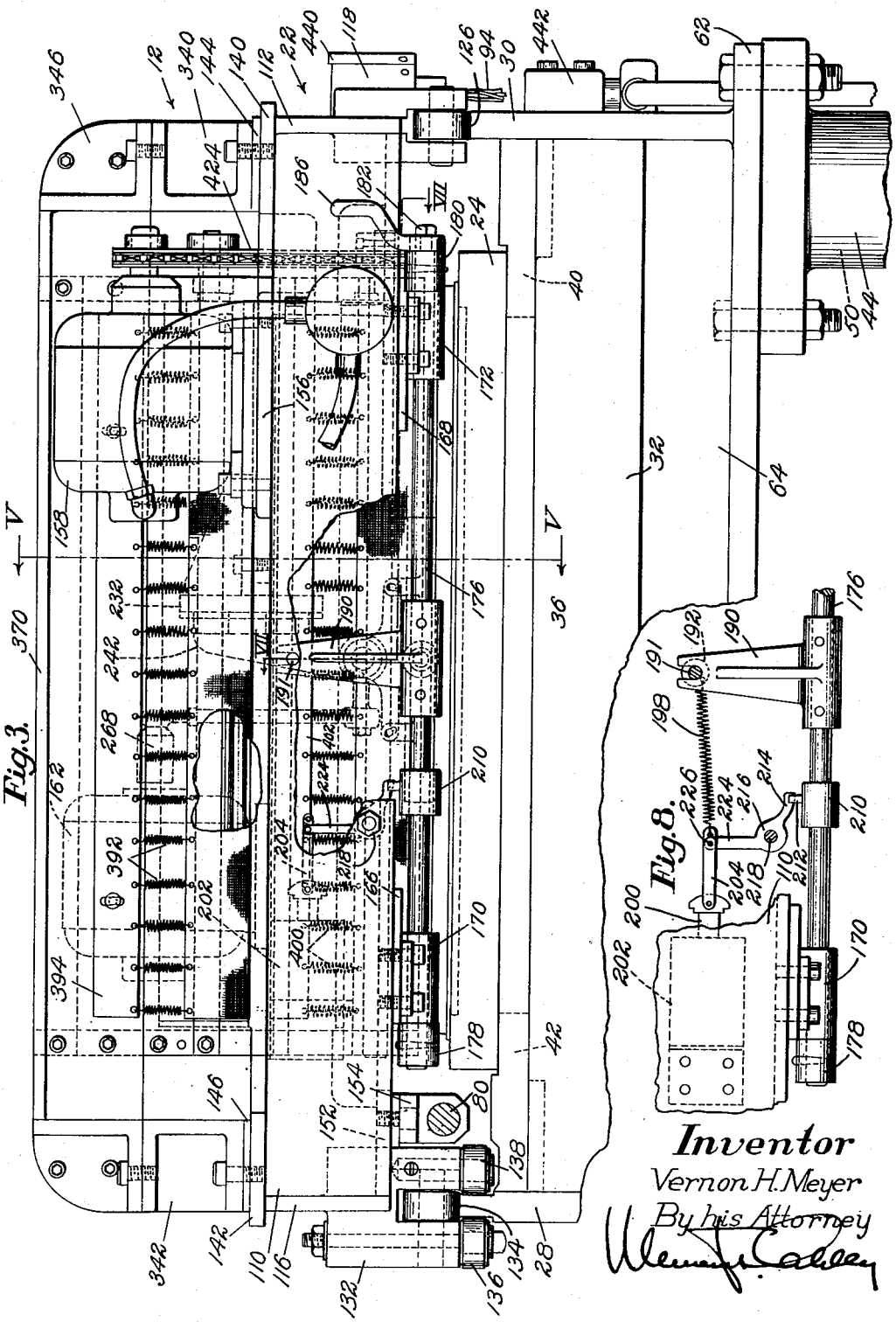
Inventor
Vernon H. Meyer
By his Attorney

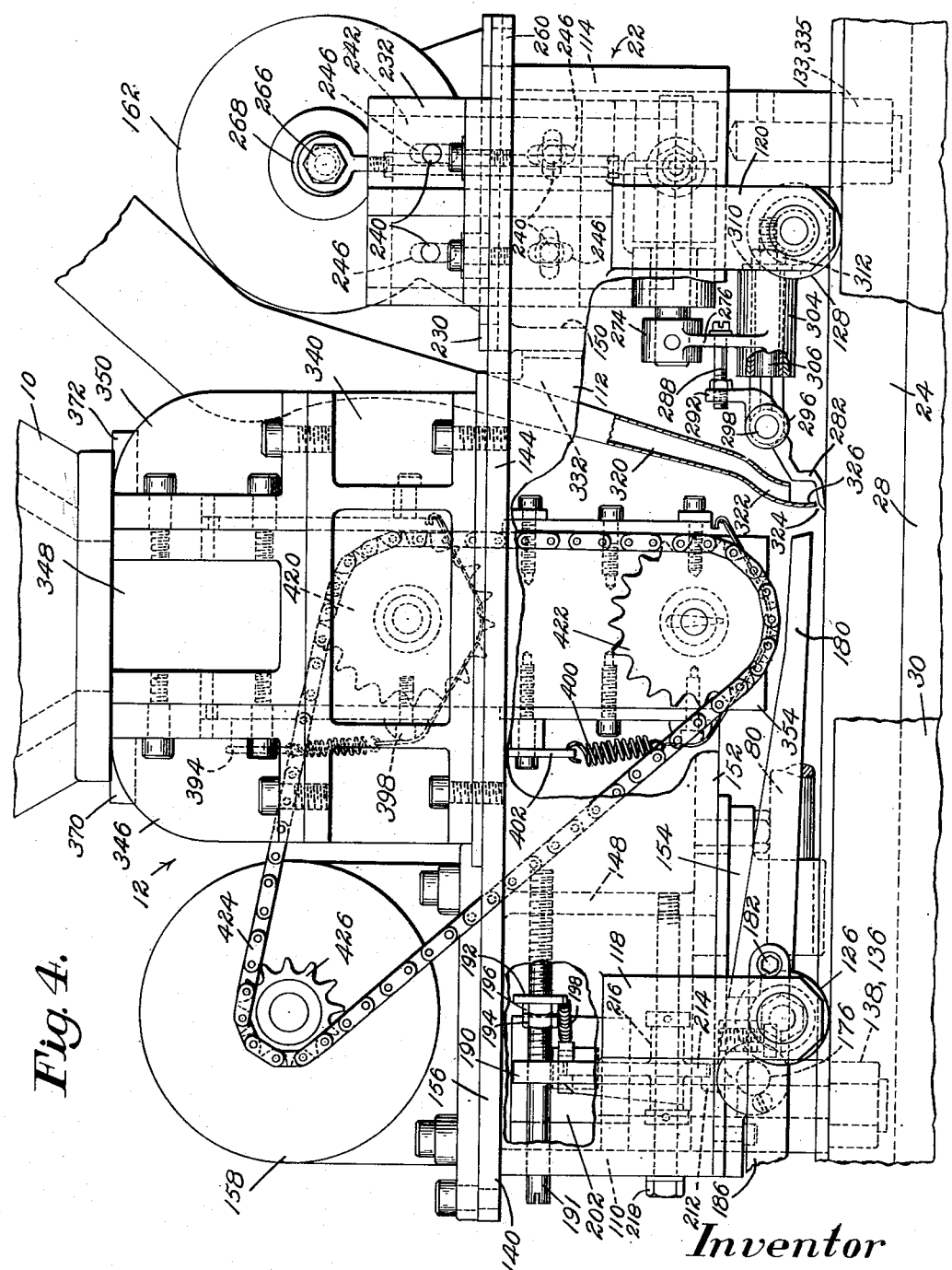

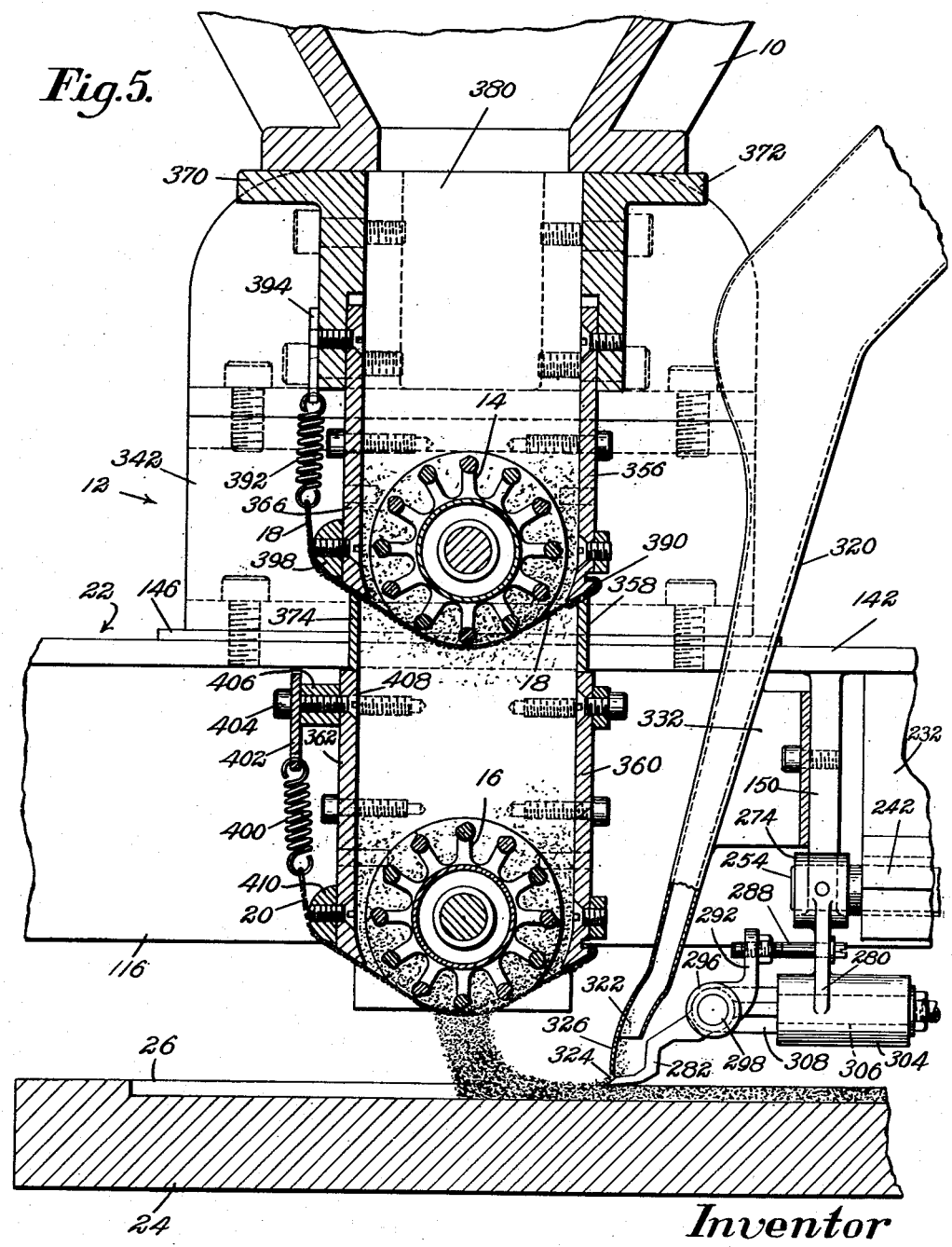

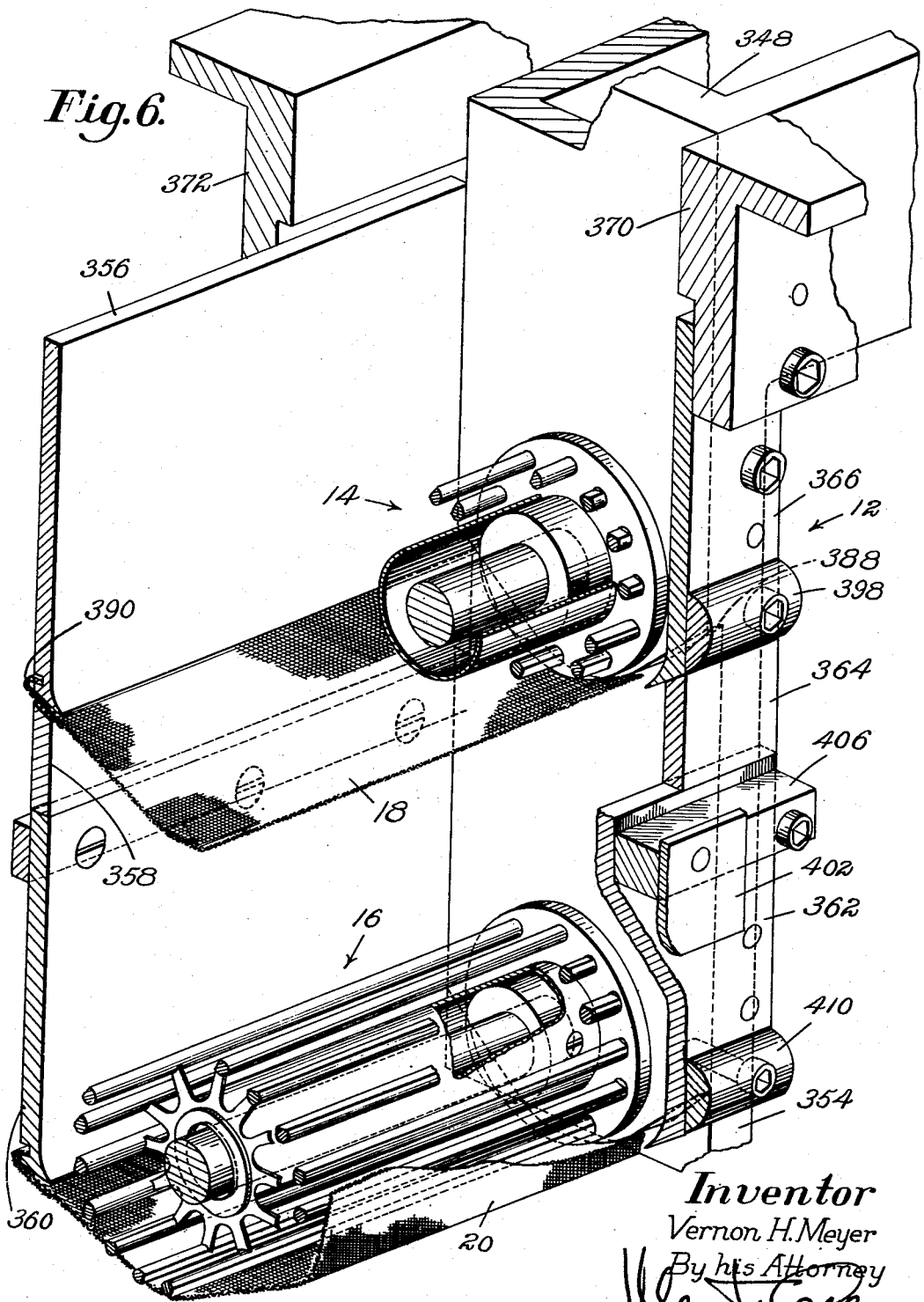

Sept. 28, 1954  V. H. MEYER  2,689,974
MOLD FILLING DEVICE FOR MAKING SHEET MATERIALS
Filed April 2, 1952  7 Sheets-Sheet 7
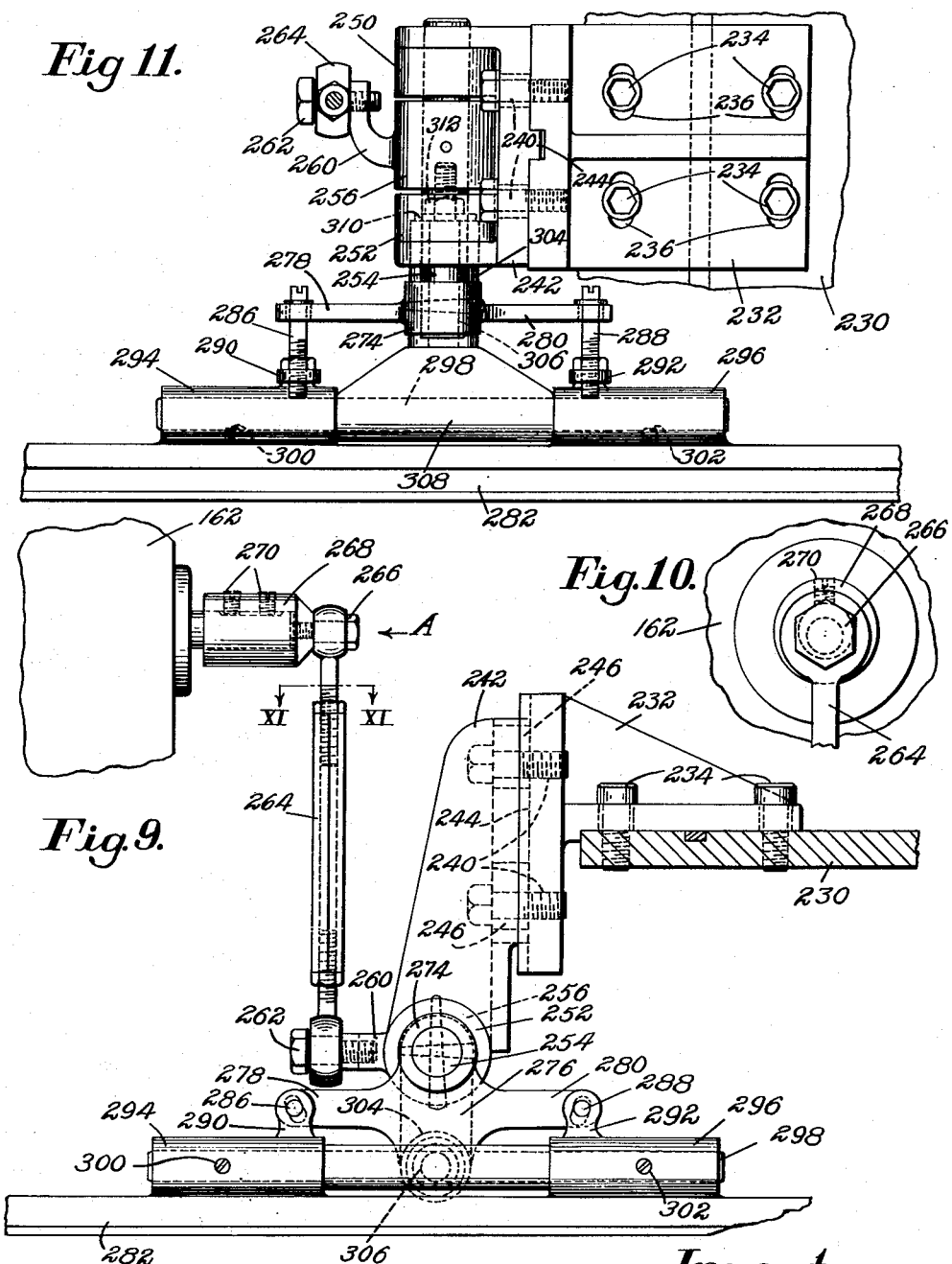
Inventor
Vernon H. Meyer
By his Attorney Patented Sept. 28, 1954

2,689,974

UNITED STATES PATENT OFFICE 2,689,974

MOLD FILLING DEVICE FOR MAKING SHEET MATERIALS

Vernon H. Meyer, Beverly, Mass., assignor to United Shoe Machinery Corporation, Flemington, N. J., a corporation of New Jersey Application April 2, 1952, Serial No. 280,066

7 Claims. (Cl. 18—1)

1

This invention relates to a machine for forming a layer of loose particles and, more particularly, to a machine for uniformly filling or charging a mold cavity with plastic particles or powder. It is specially adapted for filling a mold or receiver with plastic powder preparatory to sintering the particles into a micro-porous sheet.

Particles of thermoplastic resinous materials may be sintered together to form an integral micro-porous article or sheet as taught in the United States Patent No. 2,371,868, granted March 20, 1945 in the names of Herbert Berg and Martin Doriat. Porous plastic sheets of the above nature have been found useful as parts of footwear and also in other fields. In many cases the porosity of the sintered sheets has not been as uniform or as satisfactory as would be desirable. Despite the extreme care taken in forming a layer of uniform thickness of the plastic powder prior to sintering, the resultant sintered sheet often exhibited localized areas with widely divergent porosities. Individual insoles, made from such material, were found to be unsatisfactory and uncomfortable to the wearer only after actual wear and extended trial. As a result, sintered plastic insoles, not being consistent in quality despite similar treatment, could not be produced satisfactorily and in quantity to justify commercial use.

The present development pertains to a machine the use of which eliminates the difficulty above referred to and which makes it possible to establish and predetermine the uniformity and degree of porosity of a micro-porous sheet at a rate conducive to commercial production.

An object of the present invention is to provide a machine for forming a layer of plastic particles or dust which layer is of uniform density to give uniform porosity to an integral sheet subsequently sintered from the layer.

Another object of the invention is to provide a machine for forming a uniform layer of thermoplastic, resinous, polymeric and powderous material in a manner that is sufficiently rapid to be commercially practical for large scale manufacture of sintered micro-porous plastic sheet material.

Still another object is to provide a machine for leveling the upper surface of a deposited mass of loose particles while maintaining a uniform density in that mass.

To this end and in accordance with important characteristics of the invention, a powder dispenser with a downwardly directed discharging means is employed to fill or charge the mold cavity of a powder receiver, the dispenser in-

2 cluding a doctor blade and an excess powder suction device. Preferably and as illustrated, the dispenser is provided with a hopper, the doctor blade is vibrated, and the dispenser and receiver are relatively movable whereby the mold cavity on the receiver may be filled or charged uniformly.

The invention will now be more particularly described by reference to the accompanying drawings and thereafter pointed out in the claims.

In the drawings,

Fig. 1 is a perspective view of a major portion of a machine in which the present invention is embodied with the parts positioned for the initiation of a mold filling operation;

Fig. 2 is a perspective view, drawn to a smaller scale, showing the side of the machine opposite to that shown in Fig. 1, and with the parts as placed subsequent to a mold filling operation;

Fig. 3 is an end elevation of the machine as viewed from the end shown to the left in Fig. 1, drawn to a larger scale, and with some portions broken away for purposes of illustration and the upper hopper section being omitted;

Fig. 4 is a side elevation on an enlarged scale of a portion of the machine as shown in Figs. 1 and 3;

Fig. 5 is a sectional view on a still larger scale taken along the line V—V of Fig. 3, the mold and distributor devices proper being shown;

Fig. 6 is a perspective view of portions of the agitators and a part of the powder discharging means;

Fig. 7 is a sectional view taken along the line VII—VII of Fig. 3, showing certain details only;

Fig. 8 is a view of some of the parts shown in Fig. 3, this separate view depicting certain details more clearly;

Fig. 9 is a view of some of the assembled details shown in Fig. 4 as presented looking to the right in Fig. 4;

Fig. 10 is an enlarged view of some details shown in Fig. 9 looking in the direction of the arrow A in the latter figure; and Fig. 11 is a plan view of parts shown in Fig. 9 with a section taken along the line XI—XI of the latter figure.

In general, the machine comprises an elongated dispenser or discharging device for handling plastic powder, a receiver or mold for the plastic powder having a cavity facing the charging device, mechanism for moving the dispenser and receiver relatively whereby the cavity progressively may be filled and a suction device associated with a vibratory doctor blade cooperatively to remove excess powder dispensed to the receiver.

The dispenser includes a supply hopper 10, a downwardly directed powder discharging means 12 upon the top of which the hopper 10 is supported, together with at least one and preferably two agitators 14 and 16 (Figs. 5 and 6) and cooperating screens 18 and 20. All the parts of the dispenser are mounted on a carriage 22 for relative motion with respect to a powder receiver or mold 24 mounted beneath the carriage.

The mold or receiver 24 is in the form of an elongated tray having a shallow cavity 26 (Fig. 5) of rectangular configuration extending over the major portion of the tray. The powder receiver 24 is so constructed that the depth of the cavity 26 may be regulated or adjusted to correspond with the thickness of the ultimate sheet to be sintered but the nature of this tray is not material in so far as the present invention is concerned and the details thereof are not specifically described. As the description of the invention proceeds it may be seen that other forms of a tray or powder receiver may be used in combination with the powder dispenser and in fact the stationary tray 24 may be dispensed with and a movable platform or endless conveyor belt substituted therefor having a suitable shallow cavity or a number of cavities in its upper side to receive the powder.

In the embodiment of the invention as depicted in the drawings, the powder receiver or tray or mold 24 is supported on a horizontal structure made up of two side plates 28 and 30. These two plates are joined together by vertical end plates 32 (Fig. 1) and 34 (Fig. 2) as well as by upper horizontal plates 36 and 38 also shown in those figures. The two plates 36 and 38 are joined by horizontal side members 40 (Fig. 2) and 42 (Fig. 3) reduced or thinned innermost portions of which serve as supporting flanges upon which the longitudinal sides of the powder receiver 24 rest and may slide. The entire apparatus is supported on columns 44, 46 (Fig. 1), 48 (Fig. 2) and 50 (Fig. 3) which are joined together by horizontal members 52, 54, 56 and 58 (Fig. 1). The upper ends of the four vertical columns or posts are bolted to horizontal plates 60 and 62 which pass beneath the bottom edges of the side plates 28 and 30. The plate 60 is stiffened by a vertical flange or plate (not shown) and the plate 62 is provided with an equivalent flange 64 (Figs. 1 and 3).

Attached to the two side plates 28 and 30 is an inclined trough 66 (Figs. 1 and 2) to the lower end of which is attached a receptacle 68 (Fig. 2) for receiving excess plastic powder.

A variable speed mechanism 70 (Fig. 1) with its motor 72 is mounted beneath the horizontal plate 62 and the side plate 28. The variable speed mechanism is provided with a sprocket 74 which drives a second sprocket 76 by means of a chain 78. The sprocket 76 is rigidly affixed to one end of a threaded rod 80 end portions of which are journaled in two brackets 82 (Fig. 1) and 84 (Fig. 2). The threaded rod 80 is placed parallel with the side plate 28 and the bracket 82 (Fig. 2) is attached to the top surface of the horizontal plate 36 (Figs. 1 and 3) whereas the bracket 84 is joined to the top surface of the horizontal plate 38 (Fig. 2).

Two electrical control boxes 90 (Fig. 1) and 92 (Fig. 2) are mounted on the supporting structure beneath the inclined trough 66. The control box 90 is connected to the carriage 22 by a number of electrical cables 94 which are flexible and are of suitable length to permit movement of the carriage. The control box 92 (Fig. 2) is provided with an electrical conduit 96 which leads to the motor 72 and a second conduit 98 which leads to circuits controlled by four switches 100, 102, 104 and 106 mounted on the outside of the side plate 28. A conduit 108 is attached to the side of the plate 28 to enclose much of the wiring.

The carriage 22 is a box-like structure made up of four side plates 110, 112, 114 and 116. The side plate 112 (Fig. 1) is provided with two downwardly extending brackets 118 and 120. These serve as bearings in which two rollers 126 and 128 are journaled for rolling upon the top edge of the side plate 30. The carriage side plate 116 (Fig. 2) is provided with two trunnion blocks 130 and 132 in each of which is journaled a roller which rests upon the top edge of the side plate 28. One of these rollers 134 is shown in Fig. 3. Two rollers 136 and 138 (Fig. 3) are mounted beneath the trunnion block 132 for rotation upon vertical axes and for engagement with the opposite sides of the side plate 28. The journal block 130 is similarly provided with rollers 133 and 135 (Fig. 4) which are adapted to rotate about vertical axes and together with the rollers 136 and 138 insure that the carriage tracks properly as it moves along the side plates 28 and 30.

The carriage 22 is provided with two horizontal end plates 140 and 142 upon which the ends of the dispenser 12 rest with thin plates 144 and 146 interposed. Two vertical partitioning plates 148 and 150 (Fig. 4) join the side plates 112 and 116. Joining the bottom edges of the side plates 110, 114, 116 and the partioning plates 148 and 150 is a shelf 152 (Figs. 3 and 4) to the under side of which are attached two brackets in threaded engagement with the rod 80. Only one of these brackets 154 is shown in the drawings (Figs. 3 and 4). Joining the tops of the side plate 110 and the partitioning plate 148 is a horizontal plate 156 upon which a motor 158 is mounted. Welded to the plates 114 and 150 is a horizontal plate 160 for supporting a motor 162.

Joined to the bottom edges of the two parallel plates 110 and 148 are two plates 166 and 168 (Figs. 1 and 3) for supporting two bearing blocks 170 and 172 respectively. A shaft 176 is journaled in the blocks 170 and 172 and has two arms 178 and 180 (Figs. 3 and 4) pinned to the ends thereof. Bolted to the arm 180 at 182 is a curved manually operable lever 186 (Fig. 7). The hub of an upstanding arm 190 is pinned to a mid portion of the shaft 176 and the top of the arm 190 is notched to receive a rod 191 which is threaded into and is adjustable relatively to the wall or plate 148. A circular plate or washer 192 is in threaded engagement with the rod 191 and is held in adjustable relation therewith by two lock nuts 194 and 196. A coiled spring 198, under tension, is connected at one end to the washer 192 and the other end thereof is attached to the plunger 200 of a solenoid 202 through a link 204 (Figs. 7 and 8). The solenoid 202 is fixed to the side plate 110 by means of bolts 206 (Fig. 7).

Pinned to the shaft 176 between the arm 190 and the bearing block 170 is a cylindrical member 210 having a notched finger 212 which is adapted to engage one arm 214 of a member 216 pivoted on a long bolt 218. The latter is threaded into the vertical partition plate 148 and carries two collars 220 and 222 fixed in position by means of set screws (Fig. 7) for properly maintaining the position of the pivoted member 216. An upstanding arm 224 of the member 216 is pivoted to the link 204 by means of a pin 226.

Welded to the top edges of the side plate 114 and the partition plate 150 is a horizontal plate 230 (Fig. 2) to which is fixed a bracket 232 (Figs. 2, 9 and 11) by means of four bolts 234 which pass through slots 236 in the bracket.

Four bolts 240 are utilized to attach a bracket 242 with the aid of a tongue-and-groove arrangement 244 to the bracket 232. Slots 246 are employed whereby the bracket 242 may be adjusted vertically.

Two bored portions 250 and 252 (Fig. 11) of the bracket 242 serve as journals for a shaft 254 and between those portions a cylindrical member 256 is pinned to the shaft for rotation therewith. The member 256 bears a curved arm 260 into the end of which the reduced portion of a pivot bolt 262 is threaded. The lower end of a turnbuckle 264 is pivoted on the bolt 262 and the upper end thereof is pivoted on a bolt 266 (Figs 9 and 10). A reduced portion of the bolt 266 is threaded into the end of a cylindrical member 268 which is locked in position on the end of the shaft of motor 162 by a pair of set screws 270. It will be noted (Fig. 10) that the bolt 266 is eccentrically mounted with respect to the cylindrical member 268.

One end of the shaft 254 is extended and is in pinned relation with the hub 274 of a three-armed casting 276, two horizontal arms 278 and 280 of which are connected by pin and inclined slot arrangements to a doctor blade 282. The cross sectional shape of the blade 282 is best seen in Fig. 4 and it is to be noted that the ends of the blade 282 are arranged to rest lightly upon the edges of the powder mold or receiver 24. The inclined slots, in the arrangements referred to, are made in the ends of the arms 278 and 280 and describe arcs about the center of the shaft 254. Pins 286 and 288 pass through the slots and are threaded into upstanding lugs 290 and 292 respectively which are integral with portions 294 and 296 of the blade 282. A shaft 298 is locked in non-slidable relation with the portions 294 and 296 by means of set screws 300 and 302. A depending arm or short portion of the casting 276 is integral with a cylindrical member 304 (Figs. 4 and 11) in which is journaled a T-shaped fitting having a shaft 306 and a head 308 (Figs. 5 and 11), the latter being journaled on the shaft 298 and extending between the portions 294 and 296. The shaft 306 is held in position by means of a washer 310 and a nut 312, the washer being locked against a shoulder formed on the shaft 306.

It will be noted from Fig. 4 that the blade 282 bears a beveled edge and is trough-like in shape and also that a sheet metal manifold 320 is provided which communicates with the trough of the blade through an elongated and narrow opening 322. A narrow space 324 is provided between the lip 326 of the manifold 320 on the beveled upper side of the blade. The upper portion of the manifold 320 is broadened (Fig. 2) and is connected to two flexible conduits 328 and 330 leading to an air suction device (not shown). The manifold 320 is held in position on the carriage 12 by a bracket 332 (Fig. 5) bolted to the partition wall 150.

The dispenser, which includes the power discharging means 12, is mounted on the top plates 140 and 142 of the carriage 22 and to this end two box-like structures 340 and 342 are provided which are bolted down upon the plates 144 and 146, respectively. Each of these box-like structures has two vertical ribs to strengthen them. On the top of the box-like structure 340 are mounted three castings 346, 348 and 350. The castings 346 and 350 are bolted down upon the box-like structure 340 and to them the intermediate casting 348 is bolted into position. The latter is of L-shaped form with a short horizontal leg thereof held between the two castings 346 and 350 and the long leg thereof depending in the form of a plate 354 (Figs. 4 and 6) to define one end or narrow and vertical side of the discharging means for the plastic powder. The casting 348 extends inwardly some distance beyond the castings 346 and 348 which is sufficient for the joinder of side plates which make up the sides of the powder discharging device. These side plates are six in number and are shown in Figs. 5 and 6 as plates 356, 358, 360, 362, 364 and 366. Also attached to the casting 348 are ends of horizontal flanged members 370 and 372 which serve as supporting means for the hopper 10. These members are also recessed to receive the top marginal portions of the plates 356 and 366. The hopper 10 is held in place on the horizontal members 370 and 372 by means of studs and wing nuts 374 (Figs. 1 and 2). It is to be understood that the box structure 342 serves to support an L-shaped casting 380 which is similar to the casting 348 and two castings 382 and 384 which are similar to the castings 346 and 350.

The L-shaped casting 348 (as in the case of the casting 380) bears a downwardly directed and arcuate shoulder 388 (Fig. 6) which terminates at the bottom edges of the plates 356 and 366 and against which one end of the fine meshed screen 18 may rest. The screen 18 is provided at one edge with sheet metal anchoring means 390 which fits into a groove on the plate 356 and the other edge of the screen is provided with a series of coil springs 392 (Figs. 3 and 5) the top ends of which are anchored to a plate 394 attached to the flange member 370. The springs 392 aid in maintaining the screen 18 taut and in order to expedite their action a half round bar 398 is provided. The bottom portions of the L-shaped castings 348 and 380 are fitted and recessed to accommodate a second meshed screen 20 similar to the screen 18 and tensioned in the same manner, using a series of coil springs 400 the upper ends of which are anchored to a plate 402 joined by means of screws 404 (Fig. 5) to a bar 406. The bar 406 in turn is attached to the plate 362 by screws such as screw 408 (Fig. 5). A half round bar 410 is joined to the lower margin of the plate 362 to function in the same manner as the half round bar 398.

Journaled between and supported by the L-shaped castings 348 and 380 and engaging the screens 18 and 20 are the two agitators 14 and 16 heretofore referred to. These agitators are shown in the form of end disk members with multiple bars joining them. Each of these bars is flattened on one side properly to engage either the screen 18 or the screen 20 but it is to be understood that the specific form of agitators is not material in so far as the present invention is concerned. The agitators may be in the form of brushes instead of being rigid metallic members as depicted. The shafts of the agitators 14 and 16 are extended outside of the depending leg of the casting 348 and the ends of those shafts are fitted with sprockets 420 and 422 (Fig. 4) both of which are adapted to be driven by a chain 424 which is operated by a sprocket 426 on the shaft of the motor 158.

On the exterior of the carriage 22 a horizontal bar 430 (Fig. 2) is attached to the two trunnion blocks 130 and 132 and is arranged to support two depending switch operating members 432 and 434. Heel portions of the members 432 and 434 are so arranged as to operate the switches 100, 102, 104 and 106 when the carriage 22 reaches the ends of its path of travel, as will further appear.

Power for the motors 158 and 162 on the carriage is taken from a box 440 (Figs. 1 and 3) into which the flexible power lines 94 lead from the box 90 beneath.

Mounted on the side plate 30 is a stop and start switch 442 (Fig. 3) for controlling all the circuits.

Electrical diagrams for the circuits involved are not disclosed in the drawings as they do not form part of the present invention. Each motor may be controlled by its own hand operated switch if desired and mechanism for discharging each tray after it is filled may be dispensed with without departing from the spirit of the invention. It suffices herein to state that other forms of control may be used and the following statement of the machine operation is sufficient for the purposes at hand to show how the machine may be operated.

Assuming that the hopper 10 is full of plastic powder and that the agitators 14 and 16 are being driven or rotated by the motor 158 and the carriage 22 is in the position shown in Fig. 1, the motor 72 is started with the result that the carriage is driven at a uniform speed over the mold or tray 24 simultaneous with a longitudinal vibration being imparted to the doctor blade 282 by operation of the motor 162. It is assumed that the arms 178 and 180 have been raised to their positions as illustrated by the arm 180 in Fig. 4. This raising of the arms is done by use or lowering of the handle 186 to cause the arm 214 and the latch 212 to be placed into their positions as shown in Fig. 7. It is also assumed that suction is being applied by means of the flexible conduits 328 and 330 to the manifold 320.

As the carriage 22 moves along on the rollers resting on the plates 28 and 30, porous plastic powder is sifted or screened from the cascade sifters or screens 18 and 20 and is deposited within the cavity 26 of the tray, as shown in Fig. 5. The rate of deposition of the powder is maintained slightly in excess of that required to insure that the mold is filed. In order to remove the excess and without localizing pressure upon the powder or causing the powder to become more dense in some areas than in others, the blade 282 is reciprocated longitudinally by action of the motor 162 and the excess powder displaced by the blade is picked up by the blade and drawn off through the manifold 320.

When the carriage 22 reaches the end of its path of travel with the tray 24 filled the member 434 will operate the switch 104 with the result that all action ceases in so far as forward motion of the carriage is concerned and preferably also with respect to the air suction and any action of the blade 282 and the sifters or agitators. Simultaneous with this stoppage the solenoid 202 is actuated (because of the circuits chosen) and the bar 176 is unlatched with the result that the arms 178 and 180 drop a distance determined by the position of the nut 194 on the rod 191 with respect to the arm 190. This will bring the ends of the arms 178 and 188 into the same horizontal plane as the tray or mold 26 and the circuits are such that the motor 72 subsequently will be reversed from its original direction of rotation and the carriage 22 will return to its original position, as shown in Fig. 1. As this action occurs the dropped arms 178 and 180 serve to eject the tray 24 fully charged from the machine. When the member 432 strikes the switch 102 all power is cut off and is not again supplied until the switch 442 is closed. The switches 100 and 106 serve merely as safety switches.

A new tray 24 should be placed in position beneath the dispenser for the next filling operation but this cannot be done until the arms 178 and 180 are lifted by the use of the handle 186.

Any excess of powder which may pass by the edges of the tray or mold 24 is caught in the trough 66 and is deposited in the receptacle 68 for re-use.

Having thus described my invention, what I claim as new and desire to secure by Letters Patent of the United States is:

1. A machine for forming a layer of plastic particles comprising a powder dispenser with a downwardly directed discharging means, a doctor blade mounted in a plane parallel to said discharging means, a suction device communicating with the side of said blade nearest said discharging means, and a powder receiver having a shallow mold cavity, the said receiver and doctor blade being relatively movable with the blade in a predetermined position heightwise of the receiver to determine the level of the said particles deposited on the receiver.

2. A machine for forming a layer of plastic particles including a powder dispenser and a powder receiver mounted for relative and cooperative motion whereby the receiver progressively may be filled; said dispenser comprising an elongated and downwardly directed powder discharging means, a wedge shaped doctor blade mounted in fixed relation to and at one side of said discharging means, and a suction device communicating with said blade, said powder receiver having a shallow cavity the upper edges of the sides of which are in contiguous relation with said blade.

3. A machine for forming a layer of plastic particles comprising a powder dispenser with a downwardly directed discharging means, a tray constituting a mold with a mold cavity facing said discharging means, means for moving the dispenser and tray relatively whereby a cavity progressively may be filled from one end to the other with powder from said discharging means, a wedge shaped doctor blade with its effective edge at the top of the cavity for removing in a cutting manner any excess of particles deposited, and a suction device arranged at a spaced distance above and back from the effective edge of said doctor blade for preventing an excessive build up of particles ahead of said blade, said doctor blade and suction device being mounted in fixed relation to said discharging means.

4. A machine for forming a layer of plastic particles including a powder dispenser and an elongated powder receiver mounted for relative and cooperative motion whereby the receiver progressively may be filled along its length, said dispenser comprising an elongated and downwardly directed powder discharging means, a doctor blade mounted in fixed relation to and at one side of said discharging means, means for vibrating said blade, and a suction device communicating with the said blade, said powder receiver having a shallow cavity the upper edges of the sides of which are in continuous relation with said blade.

5. A machine for forming a layer of plastic particles comprising a hopper and a powder dispenser with a downwardly directed discharging means leading from said hopper, an agitator in said discharging means, a wedge shaped doctor blade mounted in a plane parallel to said discharging means, a suction device communicating with the side of said blade nearest said discharging means, and a powder receiver beneath said blade, the said receiver blade and suction device being relatively movable with the blade in a predetermined position heightwise of the receiver to determine the level of the said particles deposited in the receiver.

6. A machine for forming a layer of plastic particles including an elongated dispenser and a powder receiver mounted for relative and cooperative motion whereby the receiver progressively may be filled; said dispenser comprising a hopper, an elongated and downwardly directed powder discharging means, at least one agitator in said discharging means, a wedge shaped doctor blade mounted with its effective edge at one side of said discharging means for removing in a cutting manner any excess of particles deposited, means for vibrating said blade, and a suction device arranged at a spaced distance above and back from the effective edge of said doctor blade for preventing an excessive build up of particles ahead of said blade, said powder receiver having a shallow cavity the sides of which are transverse to said elongated powder dispenser and the upper edges of the sides of which are in contiguous relation with said blade.

7. A machine for leveling the upper surface of a deposited mass of loose particles, said machine comprising a wedge shaped doctor blade, means for advancing the edge of said blade with relation to said mass at the desired level and including means for vibrating said blade whereby any excess of particles is removed in a cutting manner, and suction means arranged at a spaced distance above and back from the effective edge of said doctor blade for preventing an excessive build up of particles ahead of said blade.

References Cited in the file of this patent

UNITED STATES PATENTS

| Number | Name | Date |
|---|---|---|
| 1,882,052 | Wyatt | Oct. 11, 1932 |
| 2,320,728 | Hume | June 1, 1943 |
| 2,533,263 | Johnson | Dec. 12, 1950 |